United States Patent [19]

Stephenson et al.

[11] Patent Number: 5,897,232
[45] Date of Patent: Apr. 27, 1999

[54] CAMERA WITH WIDTHWISE PSEUDO ZOOM MASKS AND METHOD OF EXPOSING A PSEUDO ZOOM IMAGE

[75] Inventors: Stanley Ward Stephenson, Spencerport; Paul Teremy, Rochester, both of N.Y.

[73] Assignee: Eastman Kodak Company, Rochester, N.Y.

[21] Appl. No.: 08/710,695

[22] Filed: Sep. 19, 1996

[51] Int. Cl.⁶ .......................... G03B 13/10; G03B 17/00
[52] U.S. Cl. .......................................... 396/380; 396/435
[58] Field of Search .................................. 396/378, 380, 396/65, 89, 207, 141, 148, 435, 436

[56] References Cited

U.S. PATENT DOCUMENTS

| 3,490,844 | 1/1970 | Sapp, Jr. ................................ 355/40 |
| 4,693,591 | 9/1987 | Saijo et al. ........................... 355/41 |
| 5,103,251 | 4/1992 | Kudo .................................. 354/195.1 |
| 5,130,733 | 7/1992 | Taniguchi et al. ................... 354/400 |
| 5,204,707 | 4/1993 | Harvey ................................. 354/75 |
| 5,289,229 | 2/1994 | Manico et al. ....................... 355/41 |
| 5,293,208 | 3/1994 | Okano et al. ......................... 355/55 |
| 5,471,265 | 11/1995 | Shibata et al. ...................... 354/76 |
| 5,486,895 | 1/1996 | Leidig et al. ........................ 355/50 |
| 5,493,356 | 2/1996 | Tokui ................................... 354/159 |
| 5,502,541 | 3/1996 | Olliver ................................. 355/38 |
| 5,625,430 | 4/1997 | Saito et al. .......................... 396/65 |
| 5,666,580 | 9/1997 | Ito et al. .............................. 396/355 |
| 5,678,093 | 10/1997 | Asakura et al. ..................... 396/379 |
| 5,732,297 | 3/1998 | Tanaka et al. ....................... 396/380 |

*Primary Examiner*—Safet Metjahic
*Assistant Examiner*—Christopher E. Mahoney
*Attorney, Agent, or Firm*—Gordon M. Stewart; Charles E. Snee, III

[57] ABSTRACT

A photographic camera (10) includes a film supply chamber (14); a film takeup chamber (16) and a film exposure gate (18) positioned between the chambers. The gate defines a maximum exposed image width (W) in a direction of film travel between the chambers and a maximum exposed image height (H) in a direction transverse to the direction of film travel. A plurality of mask members (24, 26) extend transverse to the direction of travel, each mask member being configured for masking only a portion of the maximum exposed image width. There is no mask in the camera configured for masking a portion of the maximum exposed image height. A mechanism (88–94) moves the mask members toward or away from a center of the exposure gate to reduce or increase only a final exposed image width ($W_e$), without masking the maximum exposed image height. As a result, the final width of the exposed image indicates a required enlargement of exposed image to produce a pseudo telephoto print. A viewfinder (22) may have mask members (28–34) which move synchronously with the mask members at the exposure gate; or with a zoom lens element (110–114) which also moves synchronously with the mask members at the exposure gate.

5 Claims, 5 Drawing Sheets

CAMERA WITH WIDTHWISE PSEUDO ZOOM MASKS AND METHOD OF EXPOSING A PSEUDO ZOOM IMAGE

DESCRIPTION

Technical Field

The invention concerns photographic cameras and photographic printing methods and apparatus for production of pseudo telephoto and normal mode photographic prints. More particularly, the invention concerns such cameras and methods in which the film is masked during exposure in the camera but is not masked during printing.

Background of the Invention

U.S. Pat. No. 3,490,844 discloses a camera in which masking members visible in the viewfinder are used to frame a selected, central portion of a scene for the user, so that pseudo telephoto prints can be made of that portion. The film is encoded with indicia of the selected portion of the scene. After the film has been processed to produce a negative of the latent image of the entire scene, a photographic printer senses the indicia and makes an enlarged, normal-sized print of just the selected portion. Thus, a pseudo telephoto print can be made from an exposure taken without a telephoto lens. A similar sort of camera is disclosed in commonly assigned U.S. Pat. No. 5,204,707. Some such cameras, such as that shown in U.S. Pat. No. 5,493,356, also include mechanisms for masking all four sides of the film exposure gate, so that only the selected portion is exposed onto the film. U.S. Pat. No. 5,293,208 discloses a camera and printing apparatus in which the camera adjusts its taking lens to produce improved image quality in a selected portion of the scene as viewed in a viewfinder. The film is encoded to enable the photographic printer to produce an enlarged print of the selected portion.

Thus, the prior art describes a variety of ways to produce pseudo zoom negatives and prints. A problem with known pseudo telephoto cameras is that provision must be made in the camera for optically or magnetically encoding the film to indicate that a pseudo telephoto print is desired, which adds to the cost and complexity of the camera. Cameras including masking mechanisms for both the viewfinder and all sides of the exposure gate are also costly and complicated. Such cameras do not enable the user to continuously adjust the size of the pseudo telephoto exposed image, and yet allow a photographic printer to produce a fixed, normal sized pseudo telephoto print. Some photographic printers require complex masking mechanisms, so that only the selected portion of the image will be projected onto the photographic paper. The printers also must be provided with special means for reading the indicia added to the film by the camera. A need has existed for simpler, more reliable cameras and printers for producing pseudo telephoto prints.

SUMMARY OF THE INVENTION

An objective of the invention is to provide an improved camera and method for exposing pseudo telephoto images.

A further objective is to provide an improved method and apparatus for printing pseudo telephoto images, in which a conventional scanner, ordinarily used to scan the processed film to facilitate color balance and density corrections, also is used to detect an image to be enlarged to produce a pseudo telephoto print.

Another objective is to provide such a method and apparatus in which measurements of the density of the top and bottom portions of the negative image may be used for panoramic prints, while still allowing continuous zooming of the lens system of the printer to produce a fixed, normal sized pseudo telephoto print.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A photographic camera according to the invention may comprise a film supply chamber; a film takeup chamber; and a film exposure gate positioned between the chambers, the gate defining a maximum exposed image width in a direction of film travel between the chambers and a maximum exposed image height in a direction transverse to the direction of film travel. Uniquely in accordance with the invention, a plurality of mask members are extended transverse to the direction of travel, each mask member being configured for masking only a portion of the maximum exposed image width, there being no mask in the camera configured for masking a portion of the maximum exposed image height. Means are included for moving the mask members toward or away from a center of the exposure gate to reduce or increase only a final exposed image width, without masking the maximum exposed image height. Thus, the final width of the exposed image indicates a required enlargement of exposed image to produce a pseudo telephoto print.

The camera also may include a viewfinder defining a corresponding maximum viewed image width and a corresponding maximum viewed image height; a plurality of further mask members, some further mask members being configured for masking a portion of the maximum viewed image width and other further mask members being configured for masking a portion of the maximum viewed image height; and means for moving the further mask members toward or away from a center of the viewfinder to reduce or increase both the viewed image width and the viewed image height, the viewed image having a width proportional to the final exposed image width and a height proportional to a height of a pseudo-zoomed image having the final exposed image width. Alternatively, the viewfinder may define a proportional maximum viewed image width and a proportional maximum viewed image height and may include optical means for zooming the viewfinder to provide a viewed image having not only a viewed image width corresponding to the final exposed image width, but also a viewed image height corresponding to a height of a zoomed exposed image having the final exposed image width. With either type of viewfinder, the mask members at the exposure gate and the mask members or optical means at the viewfinder may be moved synchronously.

The method of the invention is useful for exposing a photographic film with an image for a pseudo telephoto print, using a photographic camera having a film supply chamber; a film takeup chamber; a film exposure gate positioned between the chambers, the gate defining a maximum exposed image width in a direction of film travel between the chambers and a maximum exposed image height in a direction transverse to the direction of film travel. The method may include steps of prior to exposure of an image, masking only a portion of the maximum exposed image width, without masking any portion of the maximum exposed image height; adjusting the width of the masked portion toward or away from a center of the film exposure gate to reduce or increase only a final exposed image width, without masking the maximum exposed image height, whereby the final width of the exposed image indicates a required enlargement of exposed image to produce a pseudo telephoto print; and exposing the image.

The invention provides various advantages. The camera is simplified mechanically due to use of masks only for the exposed image width. The masked, large viewfinder is simpler and less expensive than complex zooming viewfinders. The printer can produce pseudo telephoto prints of a fixed, normal size from a filmstrip having images with widths which vary from image to image and are smaller than a normal width of an exposed image. The printer can detect images of different widths and produce pseudo telephoto prints of fixed, normal size without requiring use of complex masking mechanisms.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

Figure 1:
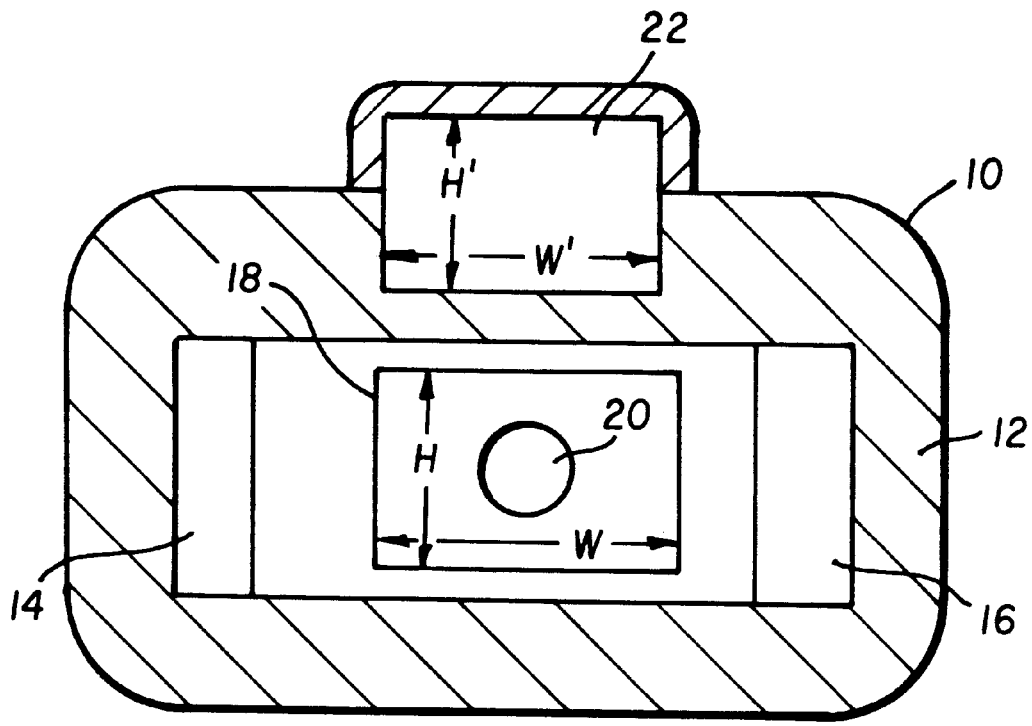
FIG. 1 shows a schematic sectional view from the back of a camera.

The following is a detailed description of the preferred embodiments of the invention, reference being made to the drawings in which the same reference numerals identify the same elements of structure in each of the several Figures.

FIG. 1 shows a schematic sectional view into the back of a conventional camera 10 which includes a housing 12 enclosing a film supply chamber 14, which may receive a conventional film cartridge; and a film takeup chamber 16, which may enclose a conventional takeup spool. Between chambers 14, 16 is located a rectangular film exposure gate 18 which, in the familiar manner, defines the exposure area for images received through a taking lens 20. Those skilled in the camera arts will appreciate that the camera would also include a film metering mechanism and shutter, not illustrated. Exposure gate 18 has a width W, measured in the direction of film travel through the camera, which defines the maximum width possible for images exposed onto a filmstrip. Exposure gate 18 also has a height H, measured in a direction transverse to the direction of film travel, which defines the maximum height possible for such images. Camera 10 further includes a viewfinder 22 having a rectangular field of view whose maximum width W' and maximum height H' are smaller than, but directly proportional to, dimensions W and H of exposure gate 18.

Figure 2:
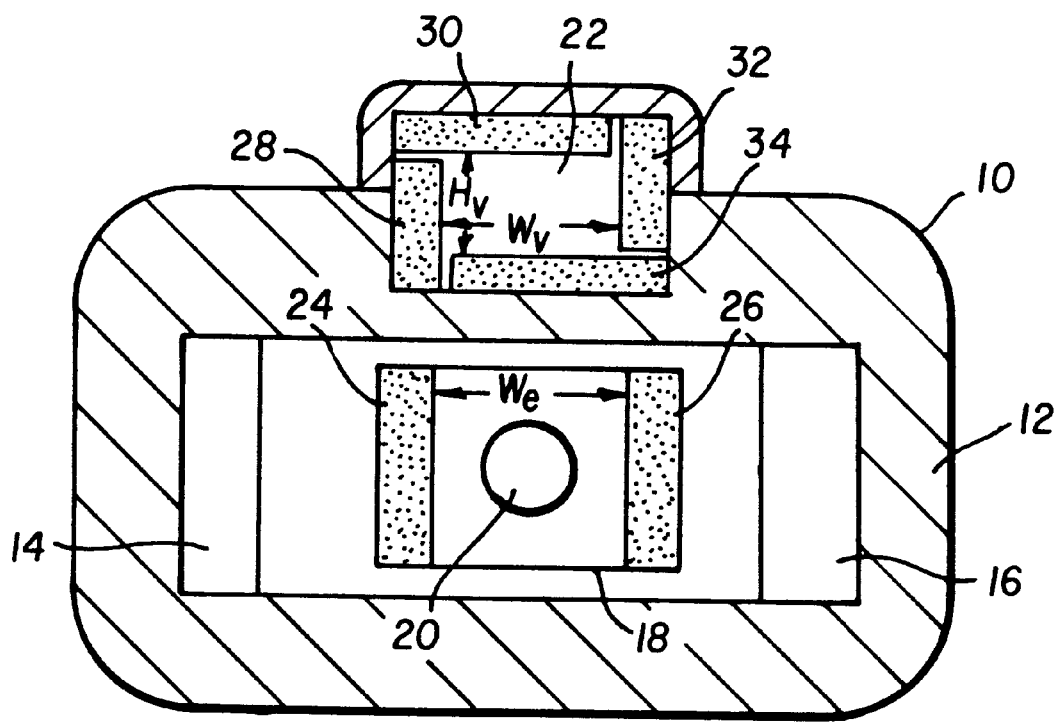
FIG. 2 shows the camera of FIG. 1 in which the scene in the viewfinder has been masked on all four sides to define a central portion of the scene for which a pseudo telephoto exposure is to be made but in which, in accordance with the present invention, the film exposure gate has been masked only to produce an exposed image width proportional to the width of the central portion of the scene viewed in the viewfinder.

As shown schematically in FIG. 2, in accordance with the invention, exposure gate 18 is provided with a pair of mask blades or elements 24, 26 which extend transverse to the direction of travel of film through the camera to mask opposite ends of maximum width W. The positions of mask elements 24, 26 can be changed, but only to change maximum width W to a reduced exposed image width $W_e$ which is proportional to a width $W_v$ of the central portion of a scene viewed in viewfinder 22. No mask members are provided in the camera which are configured to mask a portion of maximum height H. To enable the user to see a central portion of a scene for which a pseudo telephoto print is desired, viewfinder 22 is provided with mask blades or members 28, 30, 32, 34 whose positions can be changed on all four sides of the field of view to define the desired central portion having a viewed image width $W_v$ and a viewed image height $H_v$. Masking of the viewfinder also could be achieved using electronically actuated masks on a liquid crystal display panel extended across the field of view, as will be understood by those skilled in the camera arts.

Figure 3:
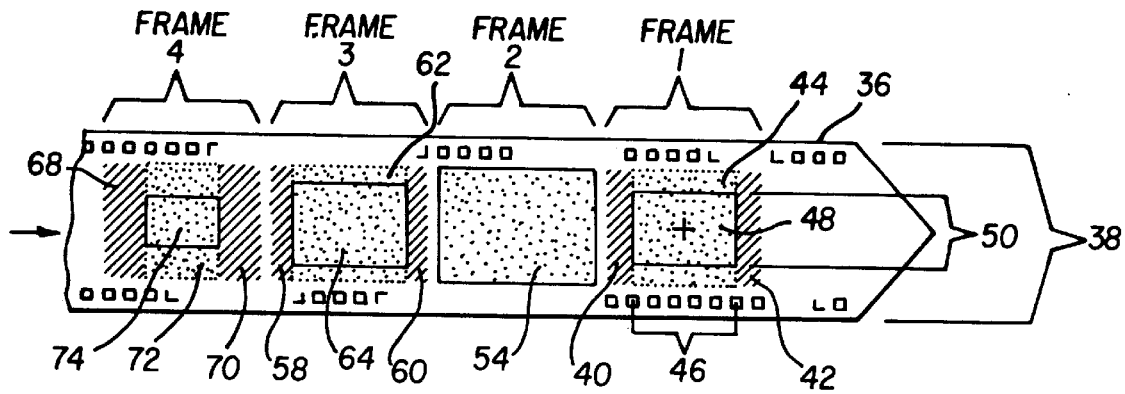
FIG. 3 shows schematically a filmstrip with four successive as exposed in the camera of FIG. 2, in which portions of certain frames have been masked to define a width of a central portion of the scene.
Figure 4:
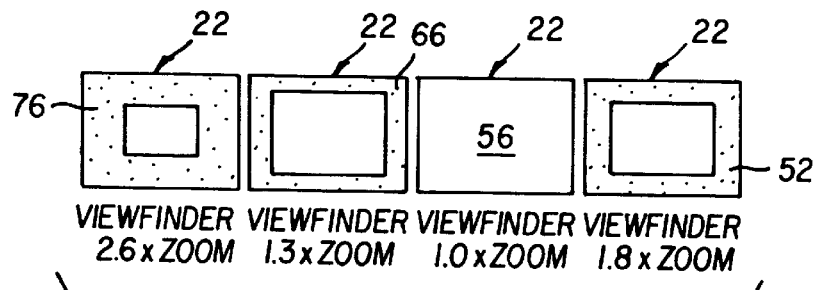
FIG. 4 shows schematically four successive configurations of the viewfinder of the camera of FIG. 2, in which the scene of the viewfinder has been masked to define both the width and height of the central portion of the scene.
Figure 5:
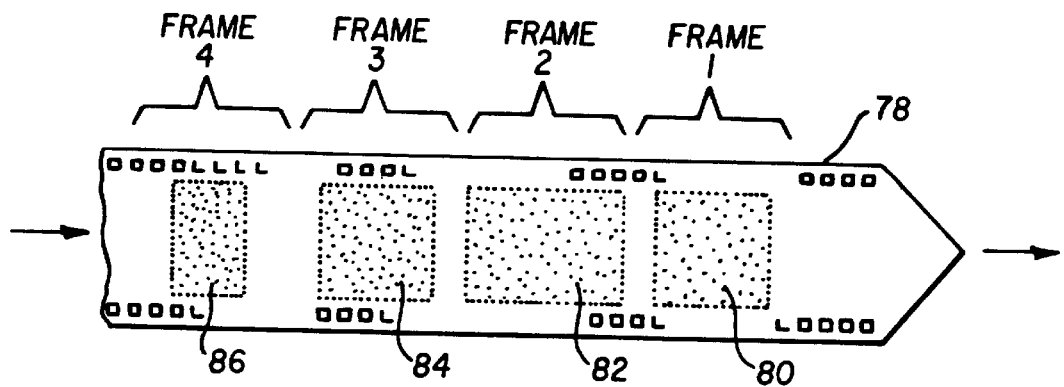
FIG. 5 shows schematically the filmstrip of FIG. 3, after the four successive frames have been processed or developed to produce four negative images with different widths in the direction of film travel but with identical heights transverse to the direction of film travel.

In use of the camera of FIG. 2, the user would view the scene through viewfinder 22 and, using a conventional actuator not illustrated, would cause mask members 28–34 to move to define a desired central portion of the scene. Mask members 24, 26 would be moved synchronously and proportionately; so that, reduced exposed image width $W_e$ would be directly proportional to viewed image width $W_v$. FIG. 3 shows how an arbitrary succession of four frames could be exposed on a filmstrip 36 having a width 38, using the camera of FIG. 2. For frame 1, mask elements 28–34 and 24, 26 would be positioned for a 1.8× zoom. Thus, transverse portions 40, 42 of frame 1 would be masked, so that the exposed image 44 would have an exposed image width 46 ($W_e$) and an exposed image height H. Exposed image width 46 would correspond to a central, rectangular zoom image portion 48 with a pseudo zoom image height 50. Image portion 48 would be enlarged to produce the desired pseudo telephoto print. FIG. 4 shows how viewfinder 22 would be masked at a portion 52 formed by mask elements 28–34, to define the desired central portion of the scene. For frame 2, mask elements 28–34 and 24, 26 would be positioned for a 1.0× zoom to produce a normal sized exposed image 54. As shown in FIG. 4, viewfinder 22 would have an unmasked field of view 56. For frame 3, mask elements 28–34 and 24, 26 would be positioned for a 1.3× zoom. Thus, transverse portions 58, 60 of frame 3 would be masked to produce an exposed image 62 encompassing a central rectangular zoom image portion 64. Viewfinder 22 would be masked at a portion 66 formed by mask elements 28–34, to define the desired central portion. For frame 4, mask elements 28–34 and 24, 26 would be positioned for a 2.6× zoom. Thus, transverse portions 68, 70 of frame 4 would be masked to produce an exposed image 72 encompassing a central rectangular zoom image portion 74. Viewfinder 22 would be masked at a portion 76 formed by mask elements 28–34, to define the desired central portion. In a completely exposed filmstrip, normal sized and pseudo zoom images could be mixed as desired by the user. The final exposed image width W, $W_e$, would indicate whether a normal or pseudo zoom print is to be made from the negative. FIG. 5 shows a film strip 78 following processing or developing, in which a plurality of negative images 80, 82, 84, 86 have been formed in the first four frames.

Figure 6:
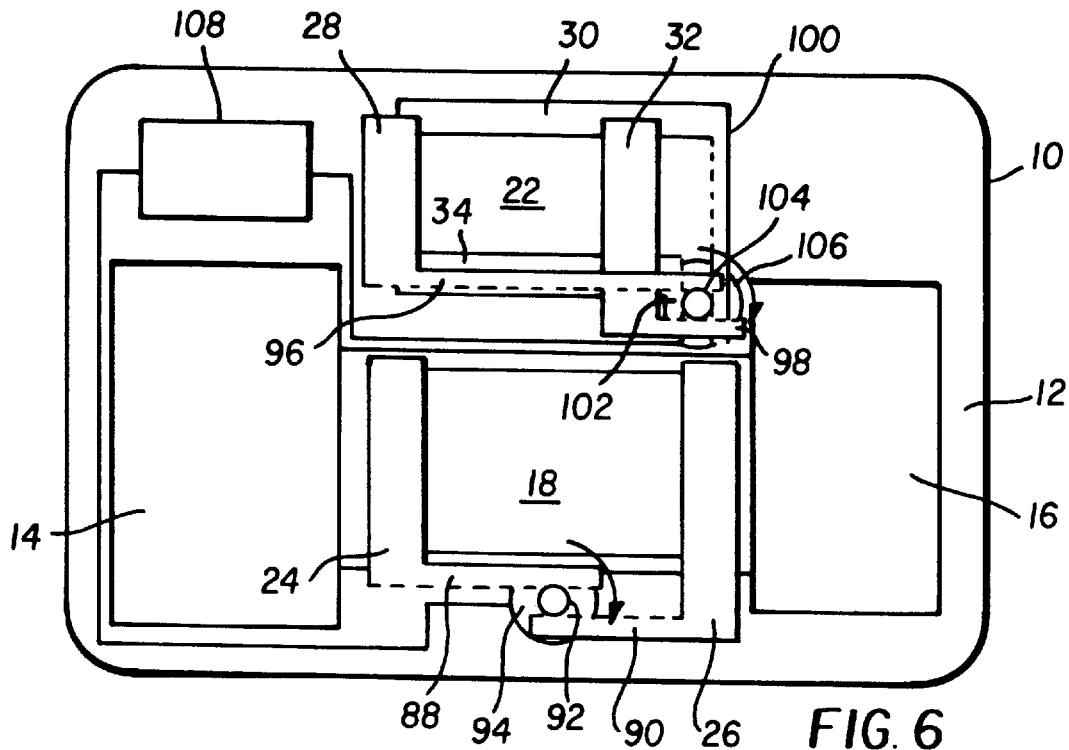
FIG. 6 shows schematically a more detailed embodiment of the camera of FIG. 2 in which the masks for the viewfinder and the film exposure gate are mechanically adjustable.

FIG. 6 shows additional detail of one embodiment of a camera according to the invention. Mask members 24, 26 are provided with respective straight gear rack members 88, 90 which extend in opposite directions and essentially parallel to the direction of movement of the filmstrip. A pinion gear 92 is meshed with gear racks 88, 90 and is connected for rotation by a drive motor 94. Thus, rotation of motor 94 will cause mask members 24, 26 to move in opposite directions. Preferably, viewfinder 22 is provided with a front aperture size of at least 20 mm to allow as much as 3× zooming, with an adequate sized field of view at extreme zoom. Mask members 28, 32 are provided with respective gear rack members 96, 98 which extend essentially parallel to the direction of movement of the filmstrip. Mask members 30, 34 are provided with respective gear rack members 100, 102 which extend transverse to the direction of movement of the filmstrip. A pinion gear 104 is meshed with gear racks 96–102 and is connected for rotation by a drive motor 106. Thus, rotation of motor 106 will cause the respective pairs of mask members to move in opposite directions to define the desired central portion of the scene. So, the combination of mask members 28–34, racks 96–102, gear 104 and motor 106 forms a means for moving the mask members toward or away from a center of the viewfinder to reduce or increase both the viewed image width and the viewed image height. The viewed image has a width proportional to the final exposed image width $W_e$ and a height proportional to a height 50, for example, of a pseudo-zoomed image 48 having the final exposed image width 46. An electronic controller 108 is connected to control motors 94, 106. Of course, all of the mask elements could be driven by a single motor, if desired, without departing from the scope of our invention. In response to actuation by the user of a zoom selector switch, not illustrated, mask elements 28–34 are caused to move to the desired position with viewed image width $W_v$ and height $H_v$. Synchronously, controller 108 will cause mask elements 24, 26 to be moved to define the corresponding reduced exposed image width $W_e$.

Figure 7:
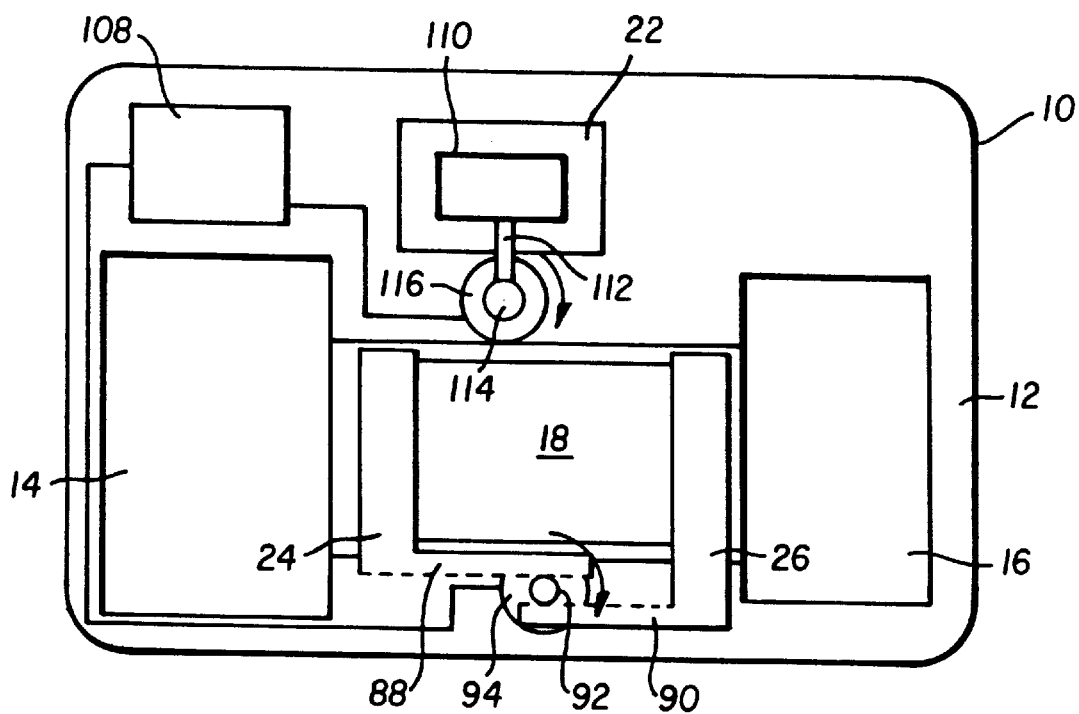
FIG. 7 shows schematically another embodiment of a camera in accordance with the invention in which the viewfinder includes a zoom lens unit and the film exposure gate includes mechanically adjustable masks.

FIG. 7 shows additional detail of another embodiment of a camera according to the invention. A zoom lens element 110, of familiar design, is mounted on a support element 112 having a gear rack which engages a worm gear 114 driven by a motor 116. Thus, the user can cause zoom lens element 110 to move to the desired position with viewed image width $W_v$ and height $H_v$. Simultaneously, controller 108 will cause mask elements 24, 26 to be moved to define the corresponding reduced exposed image width $W_e$.

Figure 8:
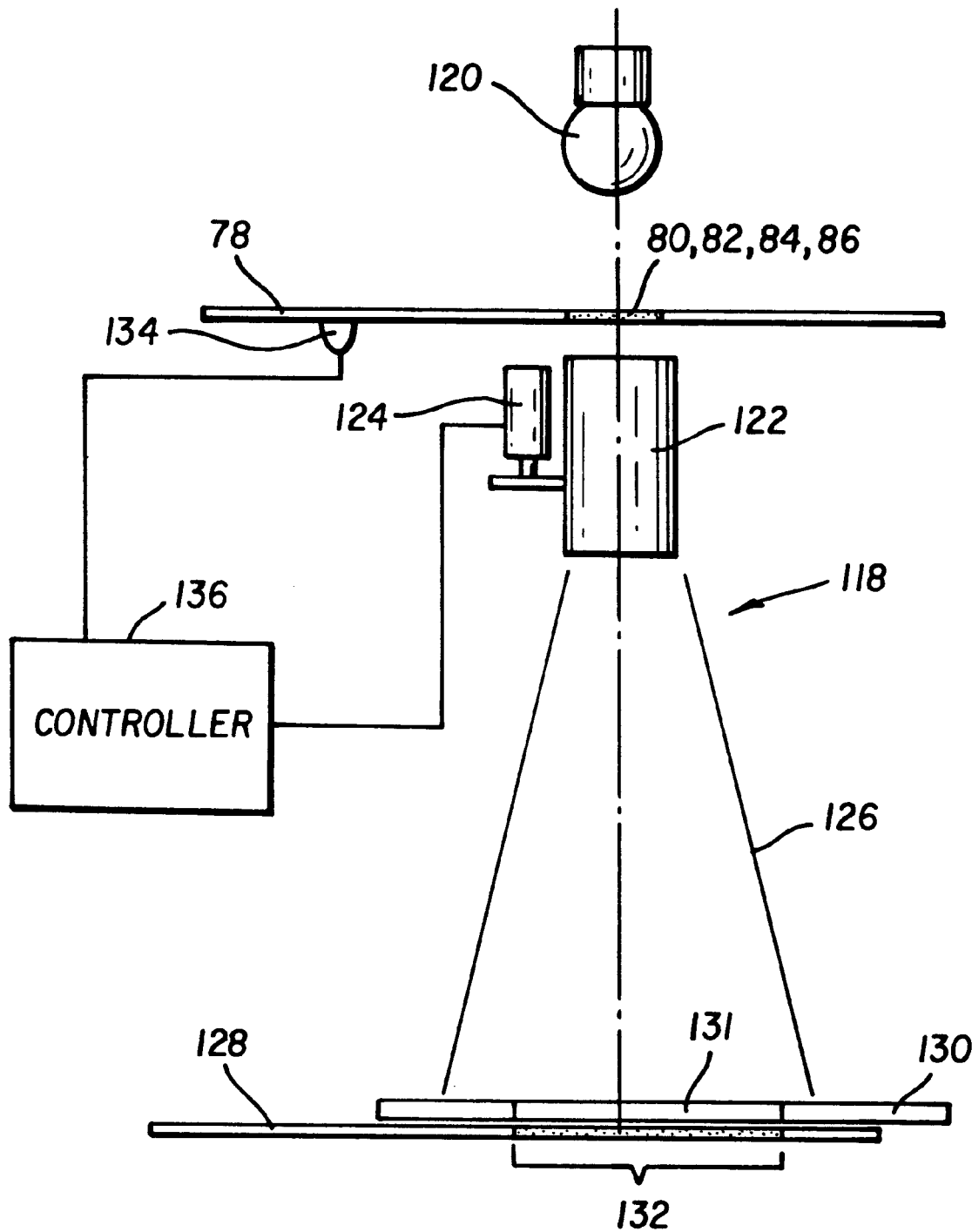
FIG. 8 shows schematically a photographic printer for producing pseudo telephoto prints in accordance with the invention.

FIG. 8 shows a schematic representation of a photographic printer 118 in accordance with the invention. A light source 120 projects light through successive negative images 80–86 of filmstrip 78. The projected light passes into a known zoom lens system 122 with magnification which can be adjusted by a lens driver 124. A beam of light 126 issues from lens system 122 and is focused onto a strip of photographic paper beneath a printing mask 130 having a rectangular mask opening 131 with a width 132 corresponding to the desired width of a completed print. As the negative images are moved into the apparatus, a conventional scanner 134 scans each image to determine whether color balance or density corrections are needed, in the familiar manner. A controller 136 then adjusts the printer in the familiar manner, as necessary to produce a print of acceptable quality.

Controller 136 may be programmed as described in commonly assigned U.S. Pat. No. 5,289,229, which is hereby incorporated by reference into this description, to use the output from scanner 134 to determine the density of the negative at each of an array of closely spaced spots on each frame. Unexposed areas of the film, which were masked by mask elements 24, 26 in the camera, will have a minimum density for each color. A threshold level would be set in controller 136 for the minimum density for each color. Controller 136 would examine the densities of each column of spots, starting from the locations of the sides of a normal sized negative image and moving inward. Thus, controller 136 would be able to detect a sharp change in density from the minimum densities for each color, as the examination proceeds from the masked portions to the negative images, thus permitting a determination of the width $W_e$ of each of negative images 80–86, for example. The first column of spots having densities above the minimum would indicate an edge of the negative image. A simple lookup table would be provided in the controller, including the magnification settings of lens system 122 needed so that each width $W_e$ will be magnified to equal width 132, the desired width of the completed print.

Figure 9:
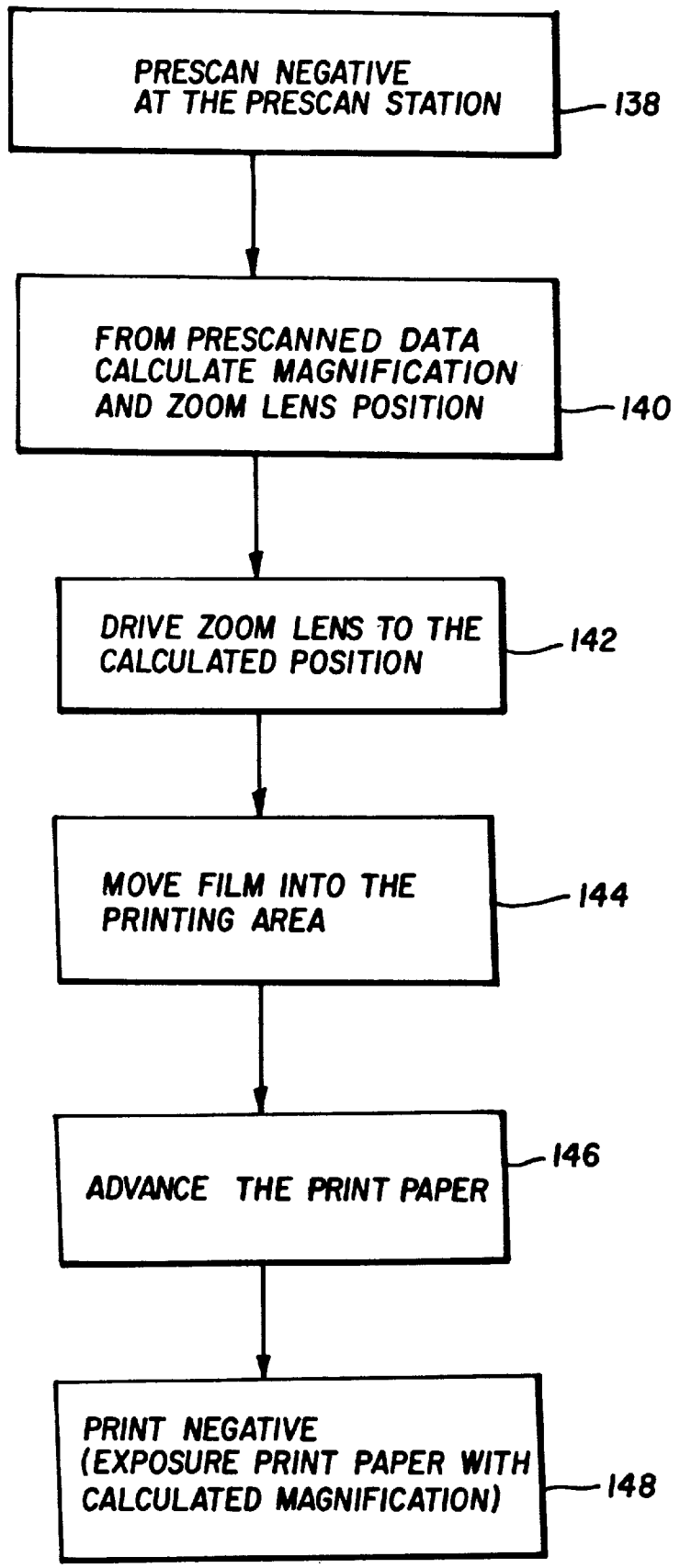
FIG. 9 shows a flow chart of the mode of operation of the printer of FIG. 8.

FIG. 9 shows a flow diagram of the method of operation of printer 118 in accordance with the invention. At step 138, each negative image is scanned at scanner 134. The scan data is provided to controller 136 which, in step 140, determines width $W_e$ and the required magnification. At step 142, driver 124 is actuated to drive lens system 122 to the position for the required magnification. At step 144, the negative image is moved to position opposite light source 120 and paper 128 is moved into position at printing mask 130. Source 120 is then illuminated to project the image onto the paper. When all of the negative images have been exposed onto the paper, the paper is processed in the conventional manner to produce a mixture of normal sized and pseudo zoom prints.

| Parts List | |
|---|---|
| 10 . . . photographic camera | 14 . . . film supply chamber |
| 12 . . . body of camera | 16 . . . film takeup chamber |
| 18 . . . film exposure gate | 76 . . . masked portion of 22 for frame 4 |
| W . . . maximum exposed image width | 78 . . . processed film strip |
| $W_e$ . . . reduced exposed image width | 80, 82, 84, 86 . . . negative images for |
| H . . . maximum exposed image height | frames 1, 2, 3, 4 |
| 20 . . . taking lens | 88 . . . gear rack member for 24 |
| 22 . . . viewfinder | 90 . . . gear rack member for 26 |
| W' . . . maximum viewed image width | 92 . . . pinion gear meshed with 88, 90 |
| $W_v$ . . . actual viewed image width | 94 . . . drive motor for 92 |
| H' . . . maximum viewed image height | 96 . . . gear rack member for 28 |

Parts List

| | |
|---|---|
| H_v ... actual viewed image height | 98 ... gear rack member for 32 |
| 24, 26 ... mask blades transverse to direction of film movement | 100 ... gear rack member for 30 |
| | 102 ... gear rack member for 34 |
| 28, 30, 32, 34 ... mask blades in 22 | 104 ... pinion meshed with 96 to 102 |
| 36 ... film strip | 106 ... drive motor for 104 |
| 38 ... film width | 108 ... controller |
| 40, 42 ... masked portions of frame 1 | 110 ... zoom lens element |
| 44 ... exposed image of frame 1 | 112 ... support for 110 |
| 46 ... width of exposed image of frame 1 | 114 ... worm gear |
| 48 ... pseudo-zoom image of frame 1 | 116 ... drive motor for 114 |
| 50 ... height of pseudo-zoom image of frame 1 | 118 ... photographic printer |
| | 120 ... light source |
| 52 ... masked portion of 22 for frame 1 | 122 ... zoom lens system |
| 54 ... exposed image of frame 2 | 124 ... lens driver |
| 56 ... view of 22 for frame 2 | 126 ... projected beam of light |
| 58, 60 ... masked portions of frame 3 | 128 ... photographic paper |
| 62 ... exposed image of frame 3 | 130 ... printing mask |
| 64 ... pseudo-zoom image of frame 3 | 131 ... rectangular opening in 130 |
| 66 ... masked portion of 22 for frame 3 | 132 ... width of printed image |
| 68, 70 ... masked portions of frame 4 | 134 ... scanner |
| 72 ... exposed image of frame 4 | 136 ... controller |
| 74 ... pseudo-zoom image of frame 4 | 138–148 ... steps of printing method |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure letters patent for:

1. A photographic camera, comprising:
    a film supply chamber;
    a film takeup chamber;
    a film exposure gate positioned between the chambers, the gate defining a maximum exposed image width in a direction of film travel between the chambers and a maximum exposed image height in a direction transverse to the direction of film travel;
    a plurality of mask members extended transverse to the direction of travel, each mask member being configured for masking only a portion of the maximum exposed image width, there being no mask in the camera configured for masking a portion of the maximum exposed image height; and
    means for moving the mask members toward or away from a center of the film exposure gate to reduce or increase only a final exposed image width, without masking the maximum exposed image height, whereby the final width of the exposed image indicates a required enlargement of exposed image to produce a pseudo telephoto print;
    the camera further comprising:
    a viewfinder defining a corresponding maximum viewed image width and a corresponding maximum viewed image height;
    a plurality of further mask members, some further mask members being configured for masking a portion of the maximum viewed image width and other further mask members being configured for masking a portion of the maximum viewed image height; and
    means for moving the further mask members toward or away from a center of the viewfinder to reduce or increase both the viewed image width and the viewed image height, the viewed image having a width proportional to the final exposed image width and a height proportional to a height of a pseudo-zoomed image having the final exposed image width.

2. A camera according to claim 1, wherein the mask members and the further mask members are moved synchronously.

3. A camera according to claim 2, further comprising:
    a viewfinder defining a proportional maximum viewed image width and a proportional maximum viewed image height; and
    optical means for zooming the viewfinder to provide a viewed image having not only a viewed image width corresponding to the final exposed image width, but also a viewed image height corresponding to a height of a zoomed exposed image having the final exposed image width.

4. A camera according to claim 3, wherein the mask members and the optical means are moved synchronously.

5. A method of exposing a photographic film with an image for a pseudo telephoto print, using a photographic camera having a viewfinder, a film supply chamber; a film takeup chamber; a film exposure gate positioned between the chambers, the gate defining a maximum exposed image width in a direction of film travel between the chambers and a maximum exposed image height in a direction transverse to the direction of film travel, the method comprising steps of:
    masking only a portion of the maximum exposed image width, without masking any portion of the maximum exposed image height;
    adjusting the width of the masked portion toward or away from a center of the film exposure gate to reduce or increase only a final exposed image width, without masking the maximum exposed image height, whereby the final width of the exposed image indicates a required enlargement of exposed image to produce a pseudo telephoto print;
    moving further mask members toward or away from a center of the viewfinder to reduce or increase both the viewed image width and the viewed image height so that the viewed image has a width proportional to the final exposed image width and a height proportional to a height of a pseudo-zoomed image having the final exposed image width; and
    exposing an image in the camera.

* * * * *